US010670869B2

(12) United States Patent
Jung

(10) Patent No.: US 10,670,869 B2
(45) Date of Patent: Jun. 2, 2020

(54) HEAD-MOUNTED DISPLAY APPARATUS

(71) Applicant: Kwan Woo Jung, Changwon-si (KR)

(72) Inventor: Kwan Woo Jung, Changwon-si (KR)

(*) Notice: Subject to any disclaimer, the term of this patent is extended or adjusted under 35 U.S.C. 154(b) by 0 days.

(21) Appl. No.: 16/130,985

(22) Filed: Sep. 13, 2018

(65) Prior Publication Data

US 2019/0317330 A1 Oct. 17, 2019

(30) Foreign Application Priority Data

Apr. 12, 2018 (KR) .................. 10-2018-0042808

(51) Int. Cl.
*G02B 27/01* (2006.01)
*G02B 27/02* (2006.01)

(52) U.S. Cl.
CPC ........ *G02B 27/0176* (2013.01); *G02B 27/022* (2013.01)

(58) Field of Classification Search
CPC .................................................. G02B 27/0176
USPC ................. 345/8; 1/1; 351/204; 359/633
See application file for complete search history.

(56) References Cited

U.S. PATENT DOCUMENTS

| 2002/0005819 | A1* | 1/2002 | Ronzani | ............... G02B 27/017 345/8 |
| 2002/0158813 | A1* | 10/2002 | Kiyokawa | ............ G02B 27/017 345/7 |
| 2013/0021311 | A1* | 1/2013 | Watanabe | .......... G02B 27/0176 345/211 |
| 2013/0335536 | A1* | 12/2013 | Kura | .................. G02B 27/0176 348/53 |
| 2015/0109576 | A1* | 4/2015 | Krasnow | ................. A61B 3/111 351/204 |
| 2016/0062126 | A1* | 3/2016 | Hiraide | .............. G02B 27/0172 359/633 |
| 2016/0360970 | A1* | 12/2016 | Tzvieli | .................. G01J 5/0265 |
| 2017/0255019 | A1* | 9/2017 | Lyons | ................ G02B 27/0172 |
| 2018/0003919 | A1* | 1/2018 | Song | ........................ G02B 7/08 |
| 2018/0011327 | A1* | 1/2018 | Perlin | ...................... G02B 3/08 |
| 2018/0035560 | A1* | 2/2018 | Kwon | ............... G02F 1/133308 |
| 2018/0110139 | A1* | 4/2018 | Seo | ..................... H04M 1/0216 |
| 2018/0124367 | A1* | 5/2018 | Ishii | ..................... G03B 21/142 |

FOREIGN PATENT DOCUMENTS

GB 2499102 A * 7/2013 ............ G02B 27/01
KR 1758110 B1 * 7/2017

* cited by examiner

*Primary Examiner* — Prabodh M Dharia
(74) *Attorney, Agent, or Firm* — Revolution IP, PLLC

(57) ABSTRACT

A head-mounted display apparatus includes: a first body including a front face having a vision hole and a rear face formed in the shape of a diving mask to cover up a user's nose and eyes; a first external body extending forward from the rear face of the first body to the front face of the first body and being spaced apart from a side surface of the first body and surrounding the side of the first body; a second body including a front face opened and a rear face having a lens mounting hole to which with a lens fixed; and a second external body extending rearward from the front face of the second body to the rear face of the second body and being spaced apart from a side surface of the second body.

5 Claims, 10 Drawing Sheets

HEAD-MOUNTED DISPLAY APPARATUS

BACKGROUND

The present invention relates to a Head-Mounted Display Apparatus in which a terminal is mounted and with which a user can enjoy an image while wearing it on his or her head, and more particularly to a Head-Mounted Display Apparatus allowing an easy assembly as well as increasing user's concentration on the image.

Recently, virtual reality and augmented reality have become an issue due to the development of technology. Virtual reality refers to a human-computer interface that makes a certain environment or situation computerized and makes a person who uses it behave as if interacting with actual surroundings or environment, and augmented reality refers to a technique of superimposing a 3D virtual image on a realistic image or background and displaying it as a single image.

As a way to realize such virtual reality and augmented reality, Head-Mounted Display (HMD) devices, which are mounted on a user's head for displaying a stereoscopic image, have been introduced.

Originally, the head-mounted display apparatus has been mainly used for image implementation of military, medical and educational video systems and entertainment virtual reality systems, but it has recently been developed in various forms as hardware including home or portable audio/video systems, wired/wireless computers, and smart phones is becoming more sophisticated.

However, the head-mounted display apparatus is not available to many users due to their high price. To solve this problem, Google's Cardboard allows users to experience virtual reality at an affordable price. With this low-cost virtual reality platform established by Google, a user can make a head-mount display as shown in FIG. 1 by folding a cardboard, attaching a lens, and inserting a terminal as specified in the specification.

Users can purchase the Google Cardboard at an affordable price and use it by folding it for themselves. However, since it is folded several times to form a head-mounted display, the assembly structure is not simple. In addition, users can not view a proper virtual reality image because there are many gaps that allow light to enter the assembled finished product.

The present invention has been made to solve the above problems, and more specifically to provide a head-mounted display apparatus which can simplify an assembling structure and increase the degree of focusing on an image by blocking light through a dual structure.

SUMMARY OF THE INVENTION

To achieve the above object, a head-mounted display apparatus of the present invention comprises: a first body formed in the shape of a diving mask to cover up a user's nose and eyes and having vision holes formed at a position where user's eyes are located; a first external body extending forward from the rear end of the first body and surrounding the side of the first body; a second body having a cross section in the shape of inverted 'ㄷ' with its front face opened and with a lens fixed to a rear face corresponding to the vision hole; and a second external body extending rearward from a front end of the second body to surround the side of the second body and having a terminal mounted on the front end thereof. According to the present invention, the top of the first external body is connected to the bottom of the second external body in such a way that the front of the first body and the rear of the second body are folded to meet each other, and so are the front end of the first external body and the rear end of the second external body; a coupling portion with coupling protrusions formed toward the outside is formed and extended at both ends of the first external body; coupling holes corresponding to the coupling protrusions are formed on both sides of the second external body; and the coupling portion is located inside the second external body when the first external body and the second external body are folded and the coupling protrusions are inserted and fixed into the coupling holes.

In addition, the coupling portion has seating protrusions on the inside to correspond to coupling protrusions; the first external body has support ribs that are recessed inwardly in the front-back direction to correspond to the seating protrusions and protruding toward the first body; the coupling portion is supported at a predetermined angle by abutting the front face of the support rib and the seating protrusions; and the coupling protrusions are firmly fitted into the coupling grooves when the first external body and the second external body are folded.

In addition, the side of the second external body is formed to have an angle equal to an angle formed between the outer surface of the coupling portion and the front face of the support rib when the front face of the support rib meets the seating protrusion.

In addition, the front face of the first body is located behind the front end of the first external body and the rear face of the second body is located behind the rear end of the second external body.

In addition, of the first external body, the lower central portion is recessed inwardly in the front-back direction to form a nose support to be seated on a user's nose; and the upper central portion is recessed inwardly in the front-back direction to form reinforcing ribs.

In addition, the front face of the reinforcing rib protrudes rearward except for the edges.

In addition, the first body, the second body, the first external body, and the second external body have inner sides inclined at a predetermined angle from the front toward the back.

In addition, all parts except the lens are made of a single material—the pulp.

Effects of the Invention

According to the present invention, a first external body and a second external body are formed to surround the side of the first body having vision holes and of the second body to which a lens is fixed in order to have a dual structure in which the first body and the second body are sealed by the first external body and the second external body. Since the first external body and the second external body are firmly fixed by one folding along with the coupling with the second external body by the coupling portion extending from the first external body, it is possible to form the head mount display by only a very simple assembly and also the light is effectively blocked until the image reproduced from the terminal reaches the user's eyes, thereby increasing the degree of focusing on the image.

Further, the present invention allows stacking a plurality of developed apparatuses to reduce transportation cost, and gives an effect of preventing environmental pollution by using a single material that can be recycled, such as pulp.

DETAILED DESCRIPTION

The present invention provides a head-mounted display apparatus that comprises: a first body with dual structure allowing an easy assembly, formed in the shape of a diving mask to cover up a user's nose and eyes so as to increase the degree of focus on an image by blocking light, and with vision holes at the points where a user's eyes are located; a first external body extending forward from the rear end of the first body and surrounding the side of the first body; a second body having a cross section in the shape of inverted '⊏' with its front face opened and with a lens fixed to a rear face corresponding to the vision hole; and a second external body extending rearward from a front end of the second body to surround the side of the second body and having a terminal mounted on the front end thereof. According to the present invention, the head-mounted display apparatus is characterized in that: the top of the first external body is connected to the bottom of the second external body in such a way that the front of the first body and the rear of the second body are folded to meet each other, and so are the front end of the first external body and the rear end of the second external body; a coupling portion with coupling protrusions formed toward the outside is formed and extended at both ends of the first external body; coupling holes corresponding to the coupling protrusions are formed on both sides of the second external body; and the coupling portion is located inside the second external body when the first external body and the second external body are folded and the coupling protrusions are inserted and fixed into the coupling holes.

The scope of the present invention is not limited to the embodiments described below, and various modifications may be made by those skilled in the art without departing from the technical scope of the present invention.

Hereinafter, a head-mounted display apparatus according to the present invention will be described in detail with reference to FIGS. 2 to 8 attached hereto.

Figure 1:
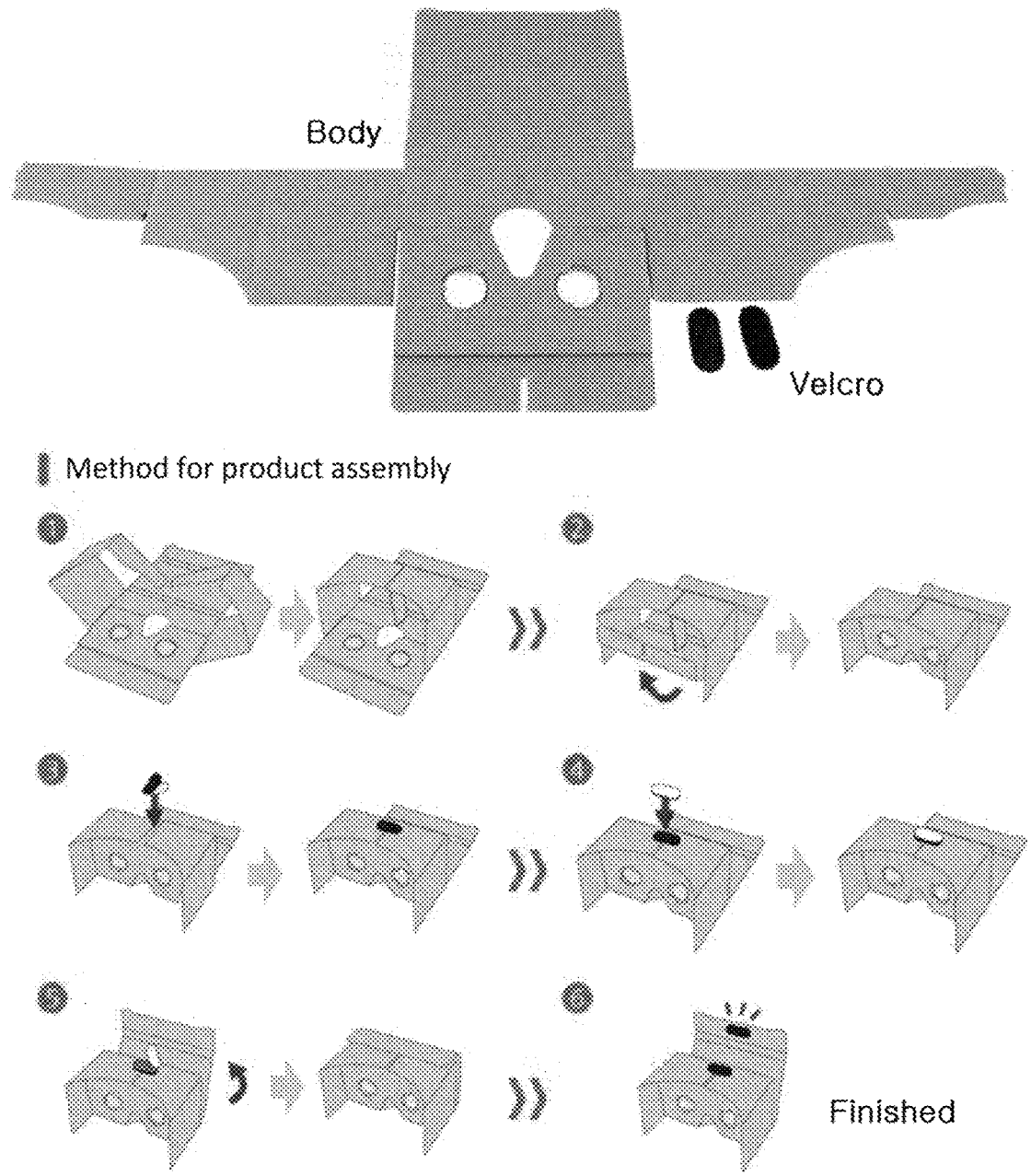
FIG. 1 is an exemplary view showing the structure and assembly process of a conventional head-mounted display apparatus.
Figure 2:
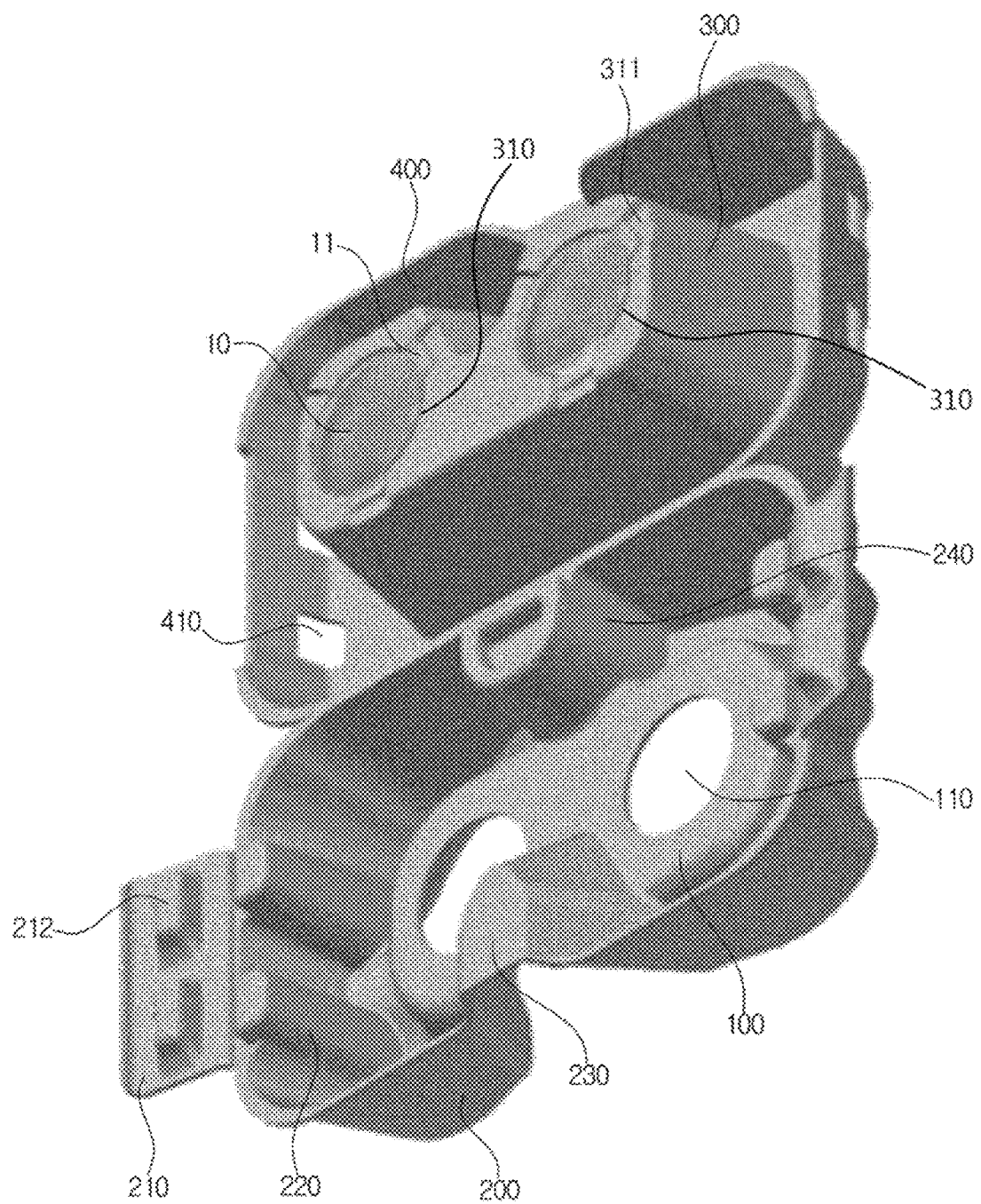
FIGS. 2 to 4 are exploded views showing the structure of a head-mounted display apparatus according to the present invention.
Figure 3:
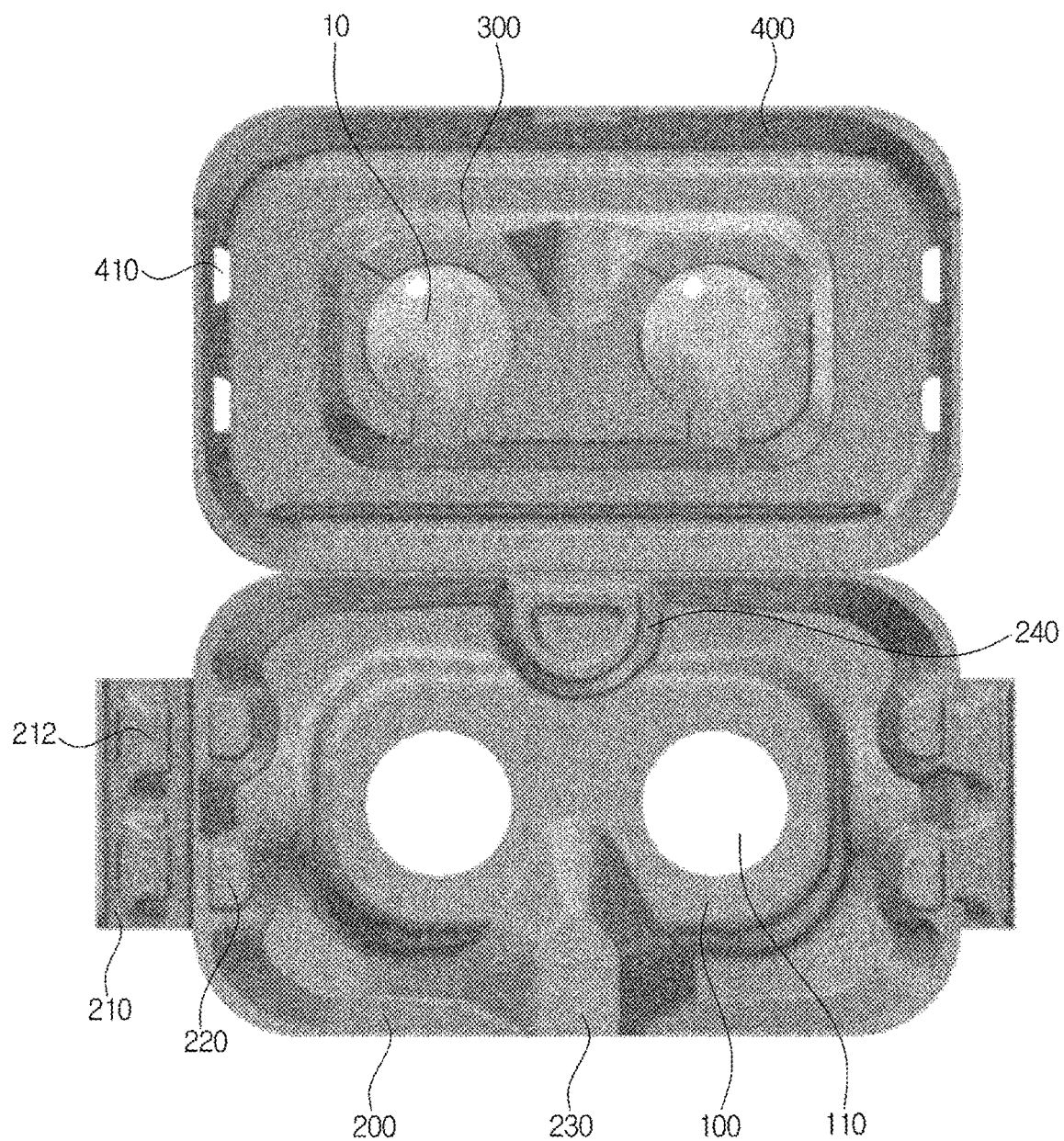
Figure 4:
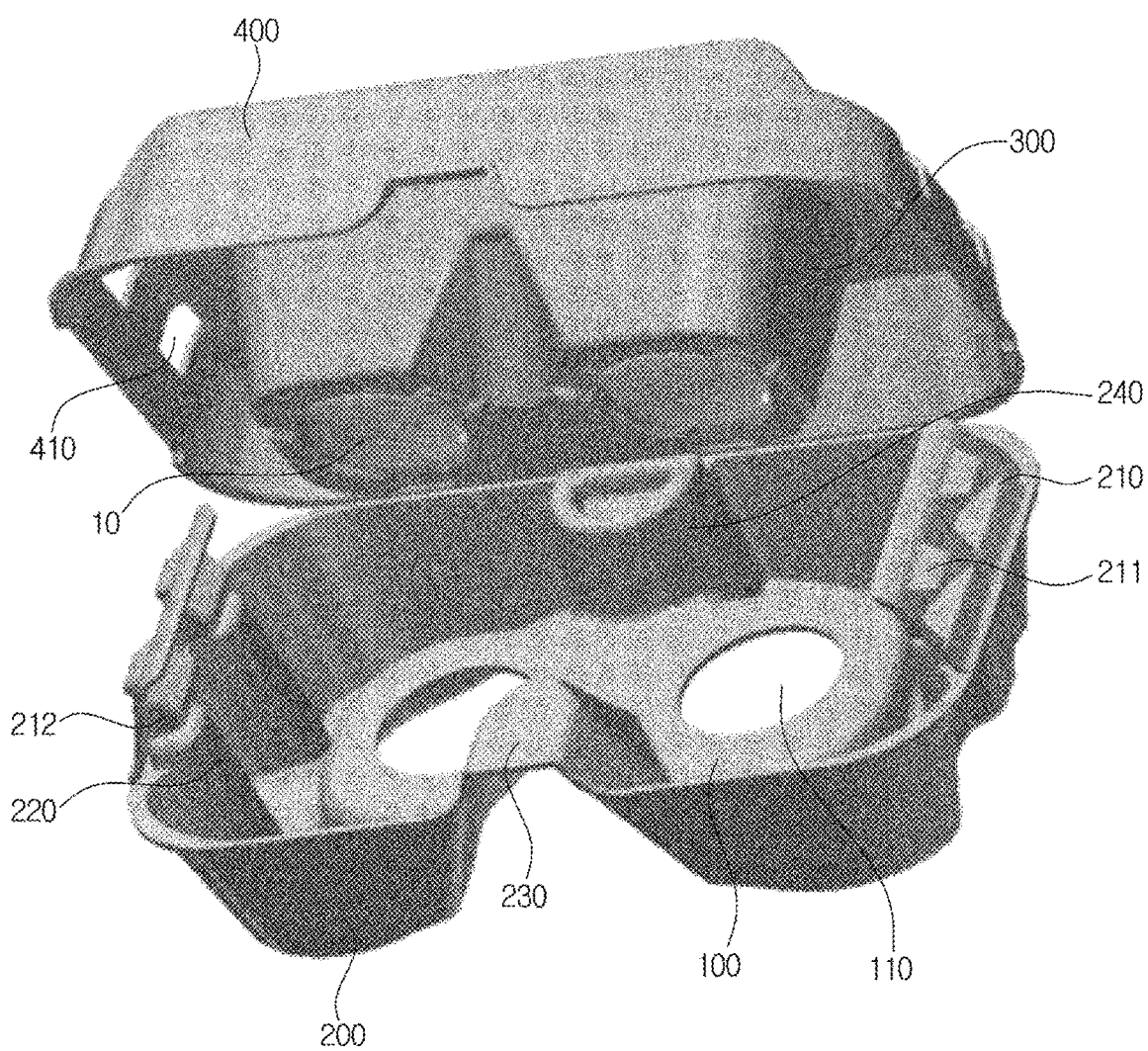

As shown in FIGS. 2 to 4, a head-mounted display apparatus according to the present invention comprises: a first body (100), a first external body (200) surrounding the side of the first body (100), a second body (300), and a second external body (400) surrounding the side of the second body (300) and having a terminal to be mounted on the front end thereof. In the following description, the front refers to the side where the terminal is placed when a user wears the head-mounted display apparatus, and the rear according to the present invention refers to the direction in which the first body (100) contacts the user.

The first body (100) is formed in the shape of a diving mask to cover up a user's nose and eyes, and vision holes (110) are formed at the points where the user's eyes are located. The vision holes (110) may be formed in various shapes, but it is preferable that they are formed in a circular shape larger than the eyes of the user so that the first body (100) does not block the user's view.

The first external body (200) extends forward from the rear end of the first body (100) to cover the side of the first body (100). It is preferable that the side of the first body (100) and the side of the first external body (200) be spaced apart from each other by a predetermined distance.

The second body (300) has a cross section in the shape of inverted '⊏' with its front side open, and the lens (10) is fixed at a point on the rear side, corresponding to the vision hole (110). Specifically, the second body (300) has lens mounting holes (310) through which a user can view images, and it is preferable that two lens mounting holes (310) be formed in consideration of the distance between the user's eyes. Further, the lens mounting hole (310) may have a plurality of fixing grooves (311) recessed to the outside of the outer circumference, and the lens (10) may have a plurality of fixing protrusions (11) projecting outwardly to correspond the fixing grooves (311).

Accordingly, the lens (10) is fixed primarily by placing a fixing protrusion (11) at the fixing groove (311), and, as will be described later, fixed secondarily when the front face of the first body (100) and the rear face of the second body (300) are in contact with each other depending on the folding of the first external body (200) and the second external body (400). The fixing protrusion (11) and the fixing groove (311) may be formed to have the same size so that the fixing protrusion (11) is firmly fixed.

When replacing a head-mounted display apparatus according to the present invention with another product due to a trouble or the like, it is easy to separate and reuse a lens (10) having the above-described coupling type.

Figure 5:
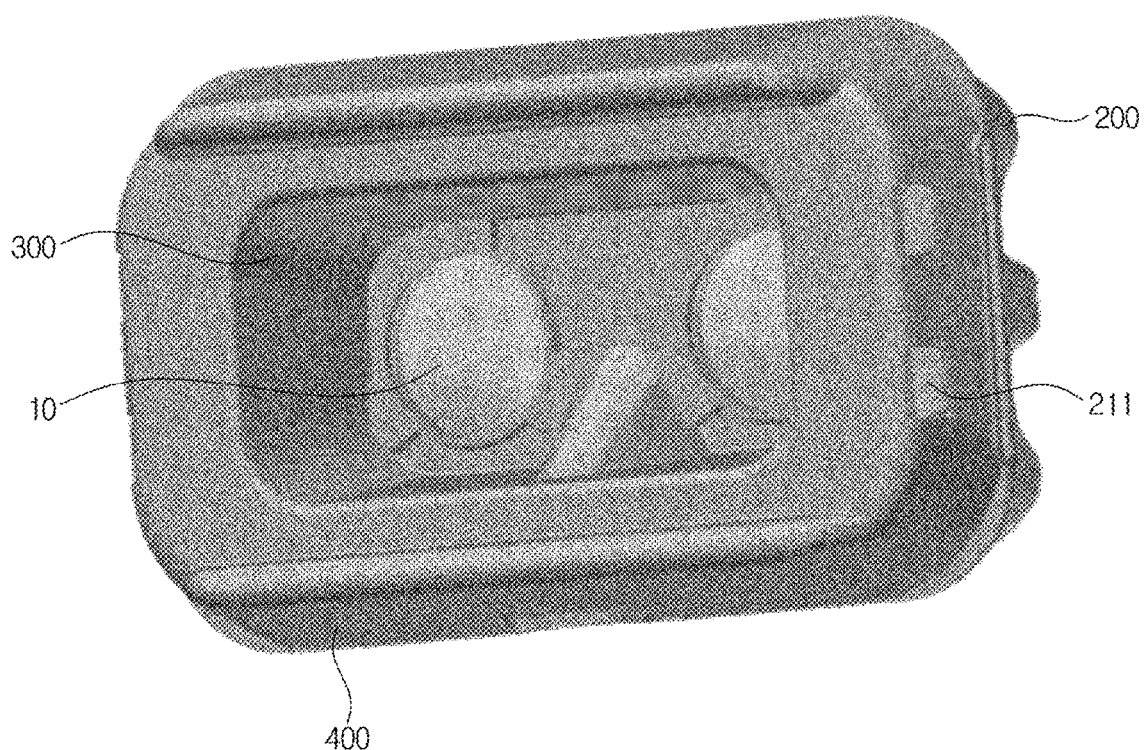
FIG. 5 is a front perspective view showing the structure of a head-mounted display apparatus according to the present invention.
Figure 6:
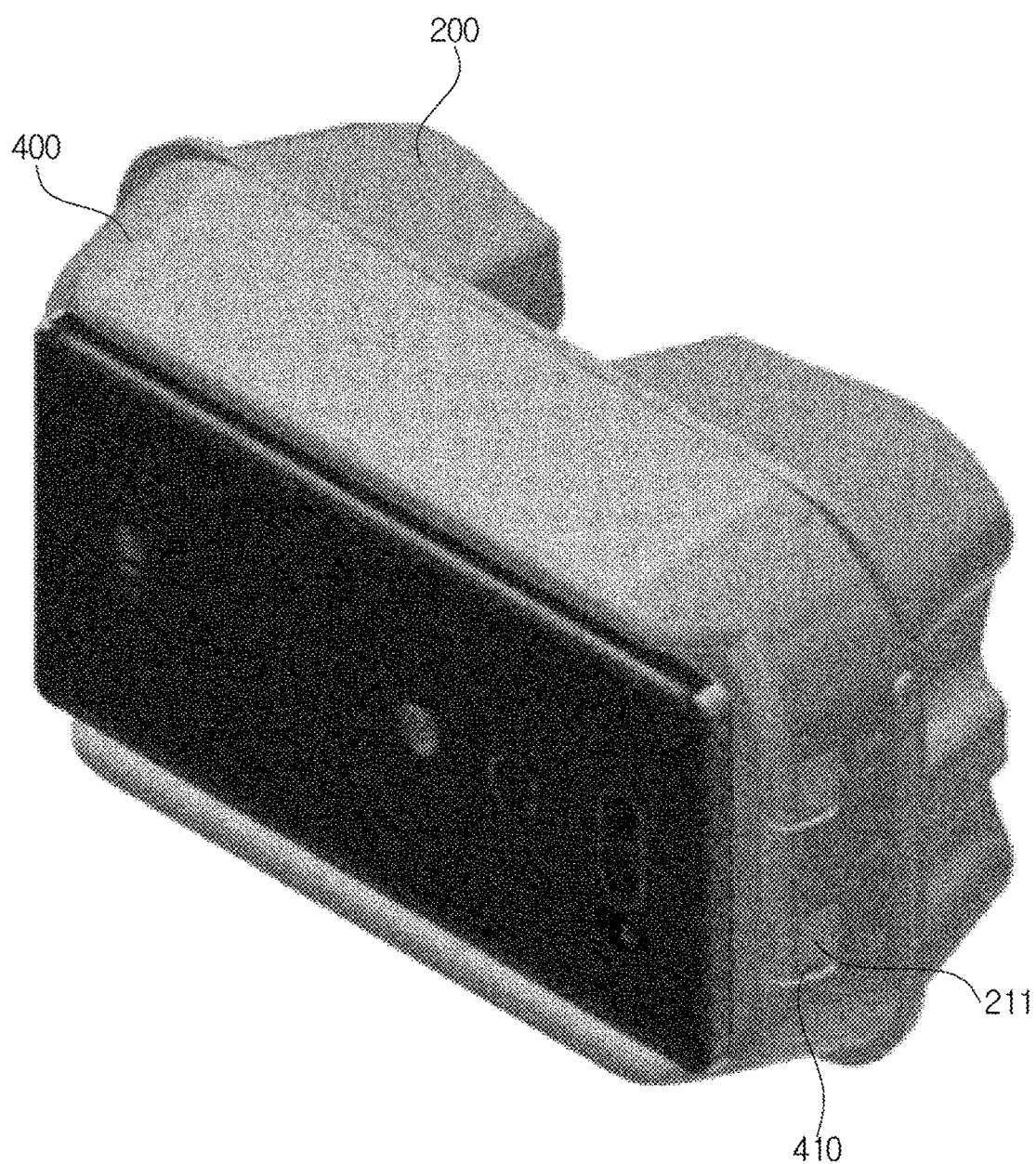
FIG. 6 is a perspective view showing a state where a terminal is mounted on a head-mounted display apparatus according to the present invention.

The second external body (400) extends rearward from the front end of the second body (300) and covers up the side of the second body (300). It is preferable that the side of the second body (300) and the side of the second external body (400) be spaced apart from each other by a predetermined distance in the same manner as the first body (100) and the first external body (200) are formed. Further, the second body (400) has a terminal at its front end: as shown in FIG. 5, the upper and lower ends of the front of the second body (400) may have protrusions protruding forward to mount a terminal so that the terminal can be firmly and securely mounted by the mounting protrusions as shown in FIG. 6.

The top of the first external body (200) and the bottom of the second external body (400) are foldably connected to each other so that the front end of the first external body (200) and the rear end of the second external body (400) are brought into contact with each other, so are the front of the first body (100) and the rear of the second body (300).

Further, a coupling portion (210) with coupling protrusions (211) protruding outwardly is extended at both ends of the first external body (200) as shown in FIG. 4 so that the first external body (200) and the second external body (400) can be firmly fixed in a folded state, and coupling holes (410) corresponding to coupling protrusions (210) are formed on both sides of the second external body (400). Therefore, when the first external body (200) and the second external body (400) are folded, the coupling portion (210) is positioned inside the second external body (400) and the coupling protrusion (211) is fixedly fitted into the coupling hole (410) as shown in FIGS. 5 and 6.

In this case, a configuration which allows the coupling portion (210) to achieve a predetermined angle may be further included so that the coupling protrusion (211) can be fitted into the coupling hole (410) only by the folding of the first external body (200) and the second external body (400), without any additional operation to fit the coupling protrusion (211) into the coupling hole (410).

Specifically, the coupling portion (210) may have seating protrusion (212) on the inner side to correspond to the coupling protrusion (211) as shown in FIGS. 2 to 4, and the first external body (200) may have a support rib (220) on its side, protruding toward the first body (100) to correspond to the seating protrusion (212).

Figure 7:
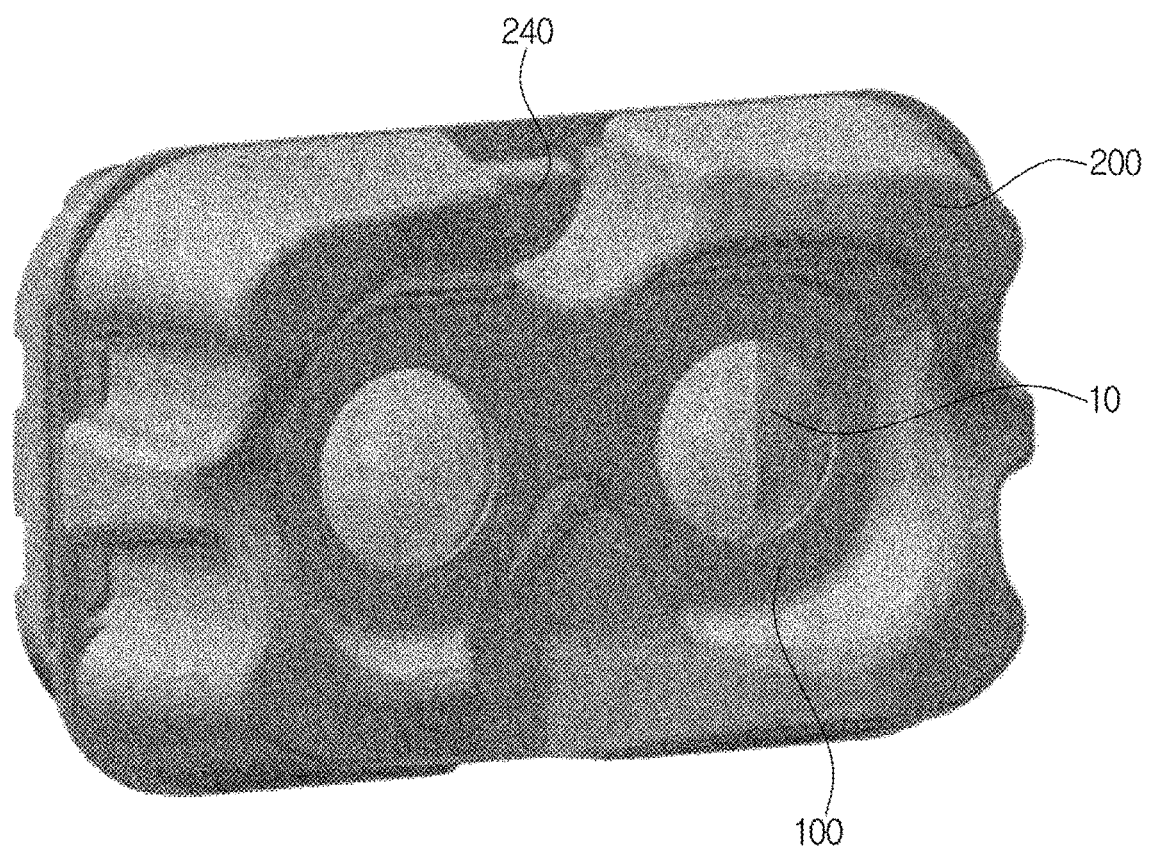
FIG. 7 is a rear perspective view showing the structure of a head-mounted display apparatus according to the present invention.

The support rib (220) may be formed such that the outer surface of the first external body (200) has a flat shape and the inner surface thereof protrudes toward the first body (100), but, as shown in FIGS. 5 to 7, in forming the support rib (220), the side surface may be recessed inwardly in the front-rear direction so that the seating protrusion (212) meets the front face and that the side surface of the first external body (200) is reinforced to prevent warping or breakage.

The coupling portion (210) is supported at a predetermined angle by making the seating protrusion (212) and the front face of the support rib (220) meet each other, and the front face of the support rib (220) may protrude forward more than the front end of the first external body (200) depending on the size, shape, etc. of the seating protrusion (212).

As the coupling portion (210) has a predetermined angle, in order for the coupling protrusion (211) to be more firmly fitted into the coupling hole (410) when the first external body (200) and the second external body (400) are folded, it is preferable that an angle to be formed on the side of the second external body (400) when the seating protrusion (212) meets the front face of the support rib (220) be equal to an angle formed between the outer surface of the coupling portion (210) and the front face of the support rib (220).

In this case, the coupling protrusion (211) protruding outward from the coupling portion (210) is formed at an angle larger than the angle formed by the side of the second external body (400), so the first external body (200) and the second external body (400) can be firmly coupled only by positioning the coupling portion (210) inside the second external body (400).

Further, the coupling protrusion (211), the seating protrusion (212), and the support rib (220) may vary in number depending on the size of the first external body (200) and the second external body (400), but a plurality is preferred for the rigidity of the coupling.

On the other hand, while the front face of the first body (100) and the front end of the first external body (200) may be formed in a line, so may the rear face of the second body (200) and the rear end of the second external body (400), there is a possibility that a minute gap is formed when the front end of the first external body (200) and the rear end of the second external body (400) are folded to meet each other and that the light may enter into the first external body (200) and the second external body (400) through the minute gap. So, it is preferable that the front face of the first body (100) be located behind the front end of the first external body (200) and that the rear face of the second body (300) be positioned behind the rear end of the second external body (400).

In this case, even if a minute gap is formed between the first external body (200) and the second external body (400), the side of the second body (200) blocks the light. The point where the first body (100) meets the second body (200) is located behind the point where the first external body (200) meets the second external body (400), so it is possible to minimize the possibility that user's image viewing is hindered due to the incoming light.

As described above, due to a dual structure where the first body (100) and the second body (300) are sealed by the first external body (200) and the second external body (400), and since the first external body (200) and the second external body (400) are firmly fixed by a single folding, as well as by the coupling between the second external body (400) and the coupling portion (210) extending from the first external body (200), the present invention can form a head-mounted display with only a very simple assembly, and increase the degree of focusing on the image by effectively blocking the light until the image reproduced from the terminal reaches the user's eyes.

Figure 10:
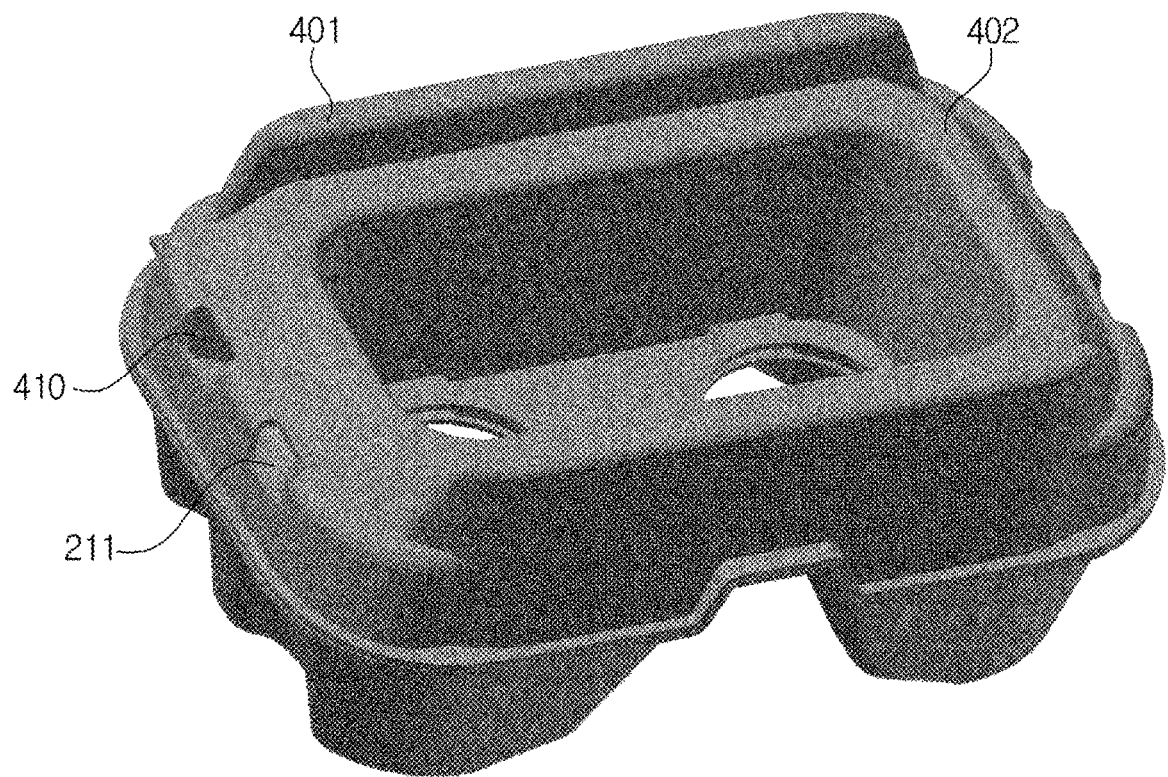
FIG. 10 is a front perspective view showing the structure of a head-mounted display apparatus according to an embodiment of the present invention.

Further, sthe second external body (400) may have a guide (401) on the terminal mounting surface of the front face, as shown in FIG. 10, to fix the terminal to prevent from escaping, and the coupling protrusion (211) and the coupling hole (410) can be coupled more naturally by allowing a height difference with the guide (401) in a stepwise manner through the projection (402) lower than the guide (401).

On the other hand, the first external body (100) may further include a structure in which the support ribs (220) reinforce both sides, as well as the lower and upper sides together. Specifically, as shown in FIGS. 2 to 4, the lower center portion of the first external body (100) may be recessed inwardly in the front-rear direction to form a nose support (230) to be seated on the user's nose, and the upper center portion thereof may be recessed inwardly in the front-rear direction to form a reinforcing rib (240).

The nose support (230) is seated on the user's nose so that the user's face comes in closer contact with the first external body (100) and prevents the first external body (100) from being twisted, and the reinforcing rib (240) serves to minimize contact with a portion between the forehead and the nose—Tzone, a relatively sweaty area—and to prevent the upper portion of the first external body (100) from being warped.

Figure 9:
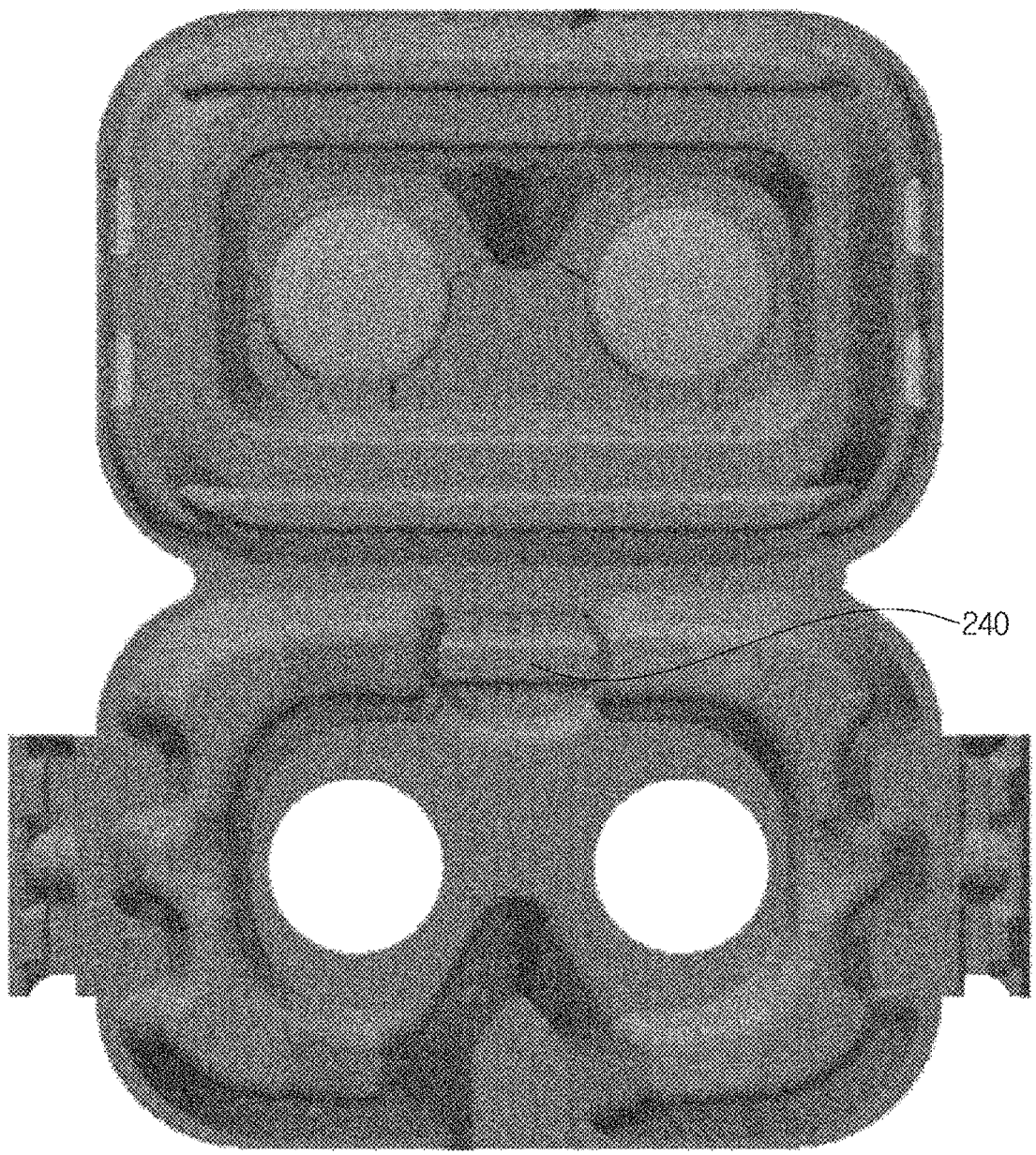
FIG. 9 is a development view showing the structure of a head-mounted display apparatus according to an embodiment of the present invention.

On the other hand, a reinforcing rib (240) may be provided in the transverse direction as shown in FIG. 9 to prevent the first external body (100) from being deformed.

Further, as shown in FIGS. 4 and 7, the reinforcing rib (240) may protrude rearward except for the edges. As a result, it is possible to prevent the first external body (100) from being torn or broken even if a distortion occurs.

On the other hand, the first body (100), the second body (300), the first external body (200), and the second external body (400) may have inner surfaces formed at the same angle from the front to the back, but, as shown in the FIGS. 2 to 4, it is preferable that the first body (100), the second body (300), the first external body (200), and the second external body (400) have inner surfaces inclined at a predetermined angle from the front to the back. For example, the first body (100) and the second external body (400) may have the distance between the sides thereof increase from the front to the rear, while the first external body (200) and the second body (300) may have the distance between the sides thereof decrease from the front to the rear.

Figure 8:
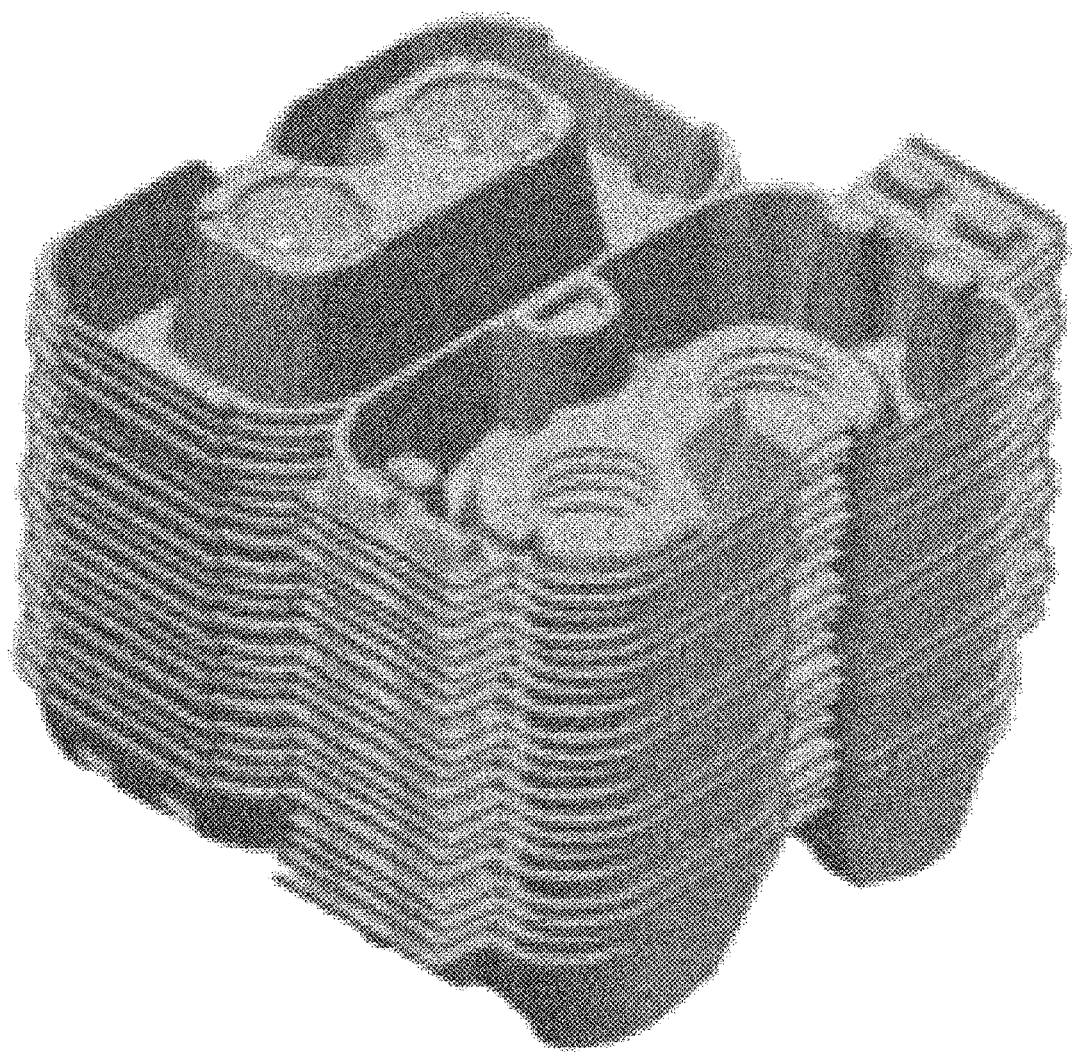
FIG. 8 is an exemplary view showing stacked head-mounted display apparatuses according to the present invention.

The first body (100), the second body (300), the first external body (200), and the second external body (400) may have their inner sides inclined at a predetermined angle from the front to the back, thereby stacking a plurality of head-mounted display apparatuses as shown in FIG. 8. So the head-mounted display device of the present invention occupies a minimum space when unfolded for transportation, thus reducing the transportation cost.

On the other hand, the above-described components of the present invention can be made of various materials, but all parts except the lens (10) can be made of a single material. In other words, additional materials are not needed to create a head-mounted display for virtual reality.

A variety of materials can be used as the single material, but pulp is particularly preferred. By using pulp in the present invention, it is possible to make a head-mounted display that is relatively light and strong compared to those made of other materials. Since the pulp is widely used for producing various products, the waste product can be recycled without being discarded to produce the present invention, thereby preventing environmental pollution.

[Description of symbols]

| | |
|---|---|
| 10: Lens | 11: Fixing protrusion |
| 100: First body | 110: Vision hole |
| 200: First external body | 210: Wing portion |
| 211: Coupling protrusion | 212: Seating protrusion |
| 220: Support rib | 230: Nose support |
| 240: Reinforcing rib | |
| 300: Second body | 310: Lens mounting hole |
| 311: Fixing groove | |
| 400: Second external body | 410: Coupling hole |

What is claimed is:

1. A head-mounted display apparatus comprises:
a first body including a front face having a vision hole and a rear face formed in the shape of a diving mask to cover up a user's nose and eyes;
a first external body extending from the rear face of the first body to the front face of the first body and being spaced apart from a side surface of the first body;
a second body including a front face opened and a rear face having a lens mounting hole to which a lens fixed; and
a second external body extending from the front face of the second body to the rear face of the second body and being spaced apart from a side surface of the second body, the second external body being foldably connected to the first external body,
wherein when the second external body is folded to the first external body, a rear end of the second external body is coupled to a front end of the first external body, the rear face of the second body is in contact with the front face of the first body and the lens is positioned in the vision hole such that the first external body and the second external body surround the side surface of the first body and the side surface of the second body, and the lens is fixed in the vision holes, and
wherein, the first external body has a coupling portion with coupling protrusions formed outwardly at both ends thereof, the second external body has coupling holes on both sides thereof corresponding to the coupling protrusions, and the coupling portion is located inside the second external body when the first external body and the second external body are folded and the coupling protrusions are inserted and fixed into the coupling holes.

2. The head-mounted display apparatus of claim 1,
wherein the coupling portion has seating protrusions on its inside so as to correspond to the coupling protrusion,
wherein the first external body has support ribs that are recessed inwardly on the side in the front-back direction to correspond to the seating protrusions and protruding toward the first body, and
wherein the coupling portion is supported at a predetermined angle by making the seating protrusion meet the front face of the support rib so that the coupling protrusion is firmly fitted to the coupling hole when the first external body and the second external body are folded.

3. The head-mounted display apparatus of claim 2,
wherein the side of the second external body has an angle equal to an angle formed between the outer face of the coupling portion and the front face of the support rib, when the front face of the support rib is in contact with the seating protrusion, and
wherein the front face of the first body is located behind the front end of the first external body and the rear face of the second body is located behind the rear end of the second external body.

4. The head-mounted display apparatus of claim 3,
wherein the first external body has a nose support of which lower center portion is recessed inwardly in the front-back direction and seated on the user's nose, while the upper center portion is recessed inwardly in the front-rear direction to form a reinforcing rib, and
wherein the front face of the reinforcing rib protrudes rearward except for the edges.

5. The head-mounted display apparatus of claim 1,
wherein the side surface of the first body, the side surface of the second body, the first external body, and the second external body are inclined at a predetermined angle.

* * * * *